Feb. 3, 1925.
H. S. BERGEN
CHECK LINK
Filed March 22, 1920
1,524,965
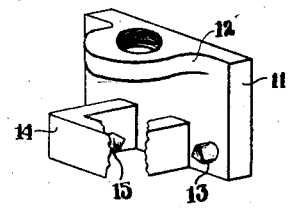
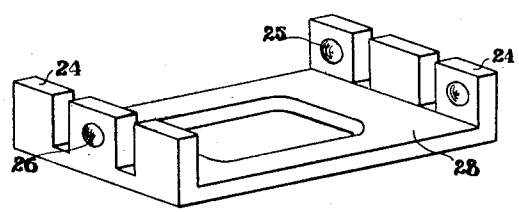
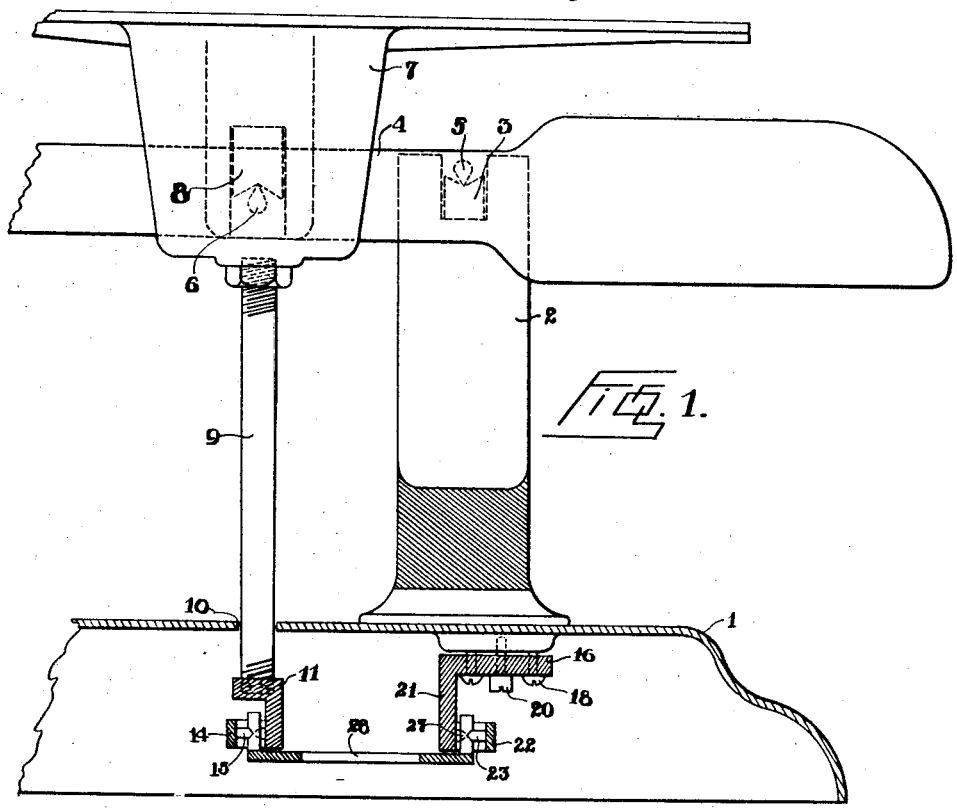
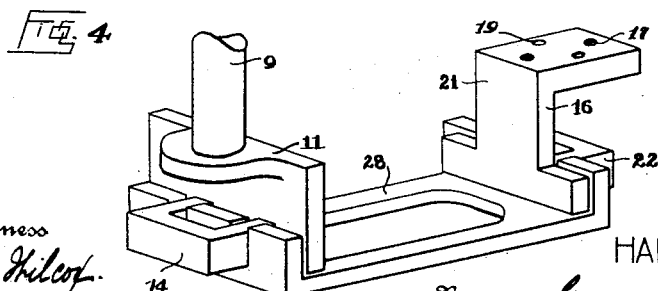
Witness
C. E. Wilcox
Inventor
HARRY S. BERGEN.
By George R. Frye
Attorney Patented Feb. 3, 1925.

1,524,965

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

CHECK LINK.

Application filed March 22, 1920. Serial No. 367,609.

*To all whom it may concern:*

Be it known that I, HARRY S. BERGEN, a citizen of the United States, residing at Toledo, in the county of Lucas and State of Ohio, have invented certain new and useful Improvements in Check Links, of which the following is a specification.

This invention relates to scales and particularly scales of the type in which the load is supported for weighing upon a single lever passing beneath the platter or other commodity-receiver. In scales of this type the lever is usually provided with a pair of load pivots, the axes of which are in alignment and parallel to the pivotal axis of the lever fulcrum. The platter is supported upon a spider having bearings which rest upon these load pivots, and in order to prevent the platter and spider from toppling fore or aft, the spider is provided with a stem which extends downwardly and is connected by means of a check link to a member rigid with the scale frame.

One of the objects of my invention is to provide such a link connection in which friction is reduced to a minimum.

Another object is to provide a device of this kind which is comparatively inexpensive and is easily assembled and adjusted.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a side elevation of a portion of a scale embodying my invention, parts being shown in section;

Figure 2 is a perspective view of a connecting member embodying some of the features of my invention, parts thereof being broken away;

Figure 3 is a perspective view of a link forming part of my invention; and

Figure 4 is a perspective view of the elements of my invention shown in assembled relation.

Since my invention relates solely to means for preventing the platform and spider from tilting, I have shown only so much of the other scale structure as will suffice to show the connection of my invention therewith. The portion of the scale frame shown in Figure 1 comprises a base housing 1 upon which is rigidly secured a base horn 2, the tips of the base horn being notched to receive bearings 3 of agate or other hard material. The main lever 4 of the scale carries a pair of aligned fulcrum pivots 5 (only one of which can be seen in the drawing), the pivots 5 being rockably carried upon the bearings 3. The lever 4 is also provided with a pair of aligned knife edge pivots 6 located a short distance rearwardly of the pivots 5 and supporting a platter spider 7 which carries a pair of inverted bearings 8 rockably resting upon the aligned edges of the knife edge pivots 6. Rigid with the spider 7 and extending downwardly therefrom through an opening 10 in the base housing 1 is a spider stem 9, the lower end of which carries a connecting plate 11. The plate 11 is provided at its upper edge with a threaded boss 12 receiving the lower end of the stem 9 and near its lower edge with a pair of rearwardly-projecting cone-tipped pins 13, the purpose of which will appear later. Detachably secured to the rearward face of the plate 11 is a U-shaped member 14, the bight portion of which carries a forwardly-projecting cone-tipped pin 15 similar in shape to the pins 13.

Secured within the base housing 1 directly beneath the base horn 2 is a bracket 16, the horizontal portion of which is provided with a pair of threaded holes 17 receiving set screws 18 and a pair of unthreaded holes 19 receiving cap screws 20 which are screwed into the under surface of the base housing, as shown in Figure 1. By loosening one of the set screws 18 and tightening the other the bracket may be swung forwardly or rearwardly, and by loosening one of the cap screws 20 and tightening the other the bracket may be swung laterally, while vertical adjustment of the bracket may be attained by loosening both set screws and tightening both cap screws, and vice versa.

The downwardly-extending arm 21 of the bracket 16 carries a pair of forwardly-projecting cone-tipped pins 27 similar in shape to the pins 13 carried by the plate 11, and secured to the forward face of the arm 21 is a U-shaped member 22, the bight portion of which carries the rearwardly-extending cone-tipped pin 23, the U-shaped member 22 being in all respects like the U-shaped member 14.

For the purpose of pivotally connecting the plate 11 and the bracket 16 I have evolved a link 28, the upturned ends 24 of which contain inwardly-opening cone-shaped recesses or sockets 25 to receive the pins 13 and 27 and outwardly-opening cone-shaped recesses to receive the pins 15 and 23, said upturned edges 24 also having notches to receive the legs of the U-shaped members 14 and 22.

In assembling the device the link 28 is applied to the bracket 16, the pins 27 engaging the cone-shaped recesses 25 at one end of the link, and the plate 11 is then swung (with the pivot 6 as a center) to bring the pins 13 into engagement with the recesses 25 at the other end of the link 28. The U-shaped members 14 and 22 are then applied respectively to the plate 11 and bracket 16 with the pins 15 and 23 engaged in the recesses 26, the U-shaped members being secured to the plate 11 and bracket 16 by screws or other fastening means. When the U-shaped members 14 and 22 are in place, the pins 13 and 15 and the pins 23 and 27 are in alignment so that they form practically frictionless pivotal connections between the parts 11, 21 and 28.

From the foregoing it will be seen that I have provided a simple and efficient check link. Since the bearing surface of each of the pins (which may, if desired, be made adjustable) is substantially a mere point, these surfaces are easily brought into alignment and the friction due to rocking of the pins in the cone-shaped recesses incident to movement of the scale in weighing is so slight as to be negligible.

While it will be apparent that the illustrated embodiment of my invention herein shown is well calculated to adequately fulfill the objects primarily stated, it is to be understood that the invention is susceptible to variation, modification and change within the spirit and scope of the subjoined claims.

Having described my invention, I claim:

1. A check link connection for weighing scales comprising, in combination, a member having oppositely extending pointed pins thereon, the points of said pins being in alignment in a direction substantially perpendicular to the axes of said pins, and a check link having oppositely opening recesses in its end, said pins being received in said recesses.

2. A pivotal connection comprising, in combination, a plate, a pair of pointed pins projecting from one face thereof, a U-shaped member secured to said plate, a pointed pin extending from the bight of said U-shaped member toward said plate, the points of said pins being in alignment, and a member having a series of recesses therein, said pins being received in said recesses.

3. A pivotal connection comprising, in combination, a plate, a pair of pointed pins projecting from one face thereof, a U-shaped member secured upon said face, a pointed pin extending from the inner side of the bight of said U-shaped member toward said plate, the points of said pins being in alignment, and a member having a series of recesses in the opposite sides thereof, said pins being received in said recesses.

4. A pivotal connection comprising, in combination, a plate, a pair of pointed pins projecting from one face thereof, a U-shaped member secured to said plate, a pointed pin extending from the bight of said U-shaped member toward said plate, the points of said pins being in alignment, and a member having a flange, said flange having recesses in the opposite sides thereof, said pins being received in said recesses.

5. A link connection comprising, in combination, a pair of plate-like members each having a pair of pointed pins projecting therefrom, a U-shaped member secured to each of said plate-like members, pointed pins projecting from the bights of said U-shaped members, the points of the pins on each plate-like member and the U-shaped members secured thereto being in alignment, a link, and flanges at the ends of said link, said flanges having notches receiving the legs of said U-shaped members and recesses receiving said pins.

6. In a weighing scale, in combination, a frame, a lever fulcrumed thereon, a commodity-receiver supported on said lever, a plate connected to said commodity-receiver, a pair of pointed pins projecting from one face of said plate, a U-shaped member secured to said plate, a pointed pin extending from the bight of said U-shaped member toward said plate, the points of said pins being in alignment, and a member having a series of recesses therein, said pins being received in said recesses, said member being pivoted to said frame.

7. In a weighing scale, in combination, a frame, a lever, a commodity-receiver thereon, a plate connected to said commodity-receiver, a pair of pointed pins projecting from one face of said plate, a U-shaped member secured upon said face, a pointed pin extending from the bight of said U-shaped member to the said plate, the points of said pins being in alignment, a bracket connected to said frame, said bracket having a plate-like portion, a pair of pointed pins projecting from one face thereof, a U-shaped member secured upon said face, a pointed pin extending from the bight of said second U-shaped member toward said bracket, the points of the pins on said bracket and the second said U-shaped member being in alignment, a link, and flanges on said link, said flanges having recesses in opposite sides thereof receiving said pins.

8. In a weighing scale, in combination, a frame, a lever, a commodity-receiver thereon, a plate connected to said commodity-receiver, a pair of pointed pins projecting from one face of said plate, a U-shaped member secured upon said face, a pointed pin extending from the bight of said U-shaped member to the said plate, the points of said pins being in alignment, a bracket connected to said frame, said bracket having a plate-like portion, a pair of pointed pins projecting from one face thereof, a U-shaped member secured upon said face, a pointed pin extending from the bight of said second U-shaped member toward said bracket, the points of the pins on said bracket and the second said U-shaped member being in alignment, a link, upturned flanges on the ends of said link, said flanges having notches receiving the legs of said U-shaped members, and oppositely-opening recesses receiving said pins.

HARRY S. BERGEN.

Witnesses:
C. E. WILCOX,
C. O. MARSHALL.